(12) United States Patent
Berman et al.

(10) Patent No.: US 11,398,970 B2
(45) Date of Patent: Jul. 26, 2022

(54) INTERNET LAST-MILE OUTAGE DETECTION USING IP-ROUTE CLUSTERING

(71) Applicant: Cisco Technology, Inc., San Jose, CA (US)

(72) Inventors: Adam Laufer Berman, San Francisco, CA (US); Samuel Eugene Weitzman, San Francisco, CA (US); Antoine Goujon, Brive-la-Gaillarde (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/950,472

(22) Filed: Nov. 17, 2020

(65) Prior Publication Data

US 2022/0045931 A1 Feb. 10, 2022

Related U.S. Application Data

(60) Provisional application No. 63/061,445, filed on Aug. 5, 2020.

(51) Int. Cl.
*H04L 45/02* (2022.01)
*H04L 69/16* (2022.01)
(Continued)

(52) U.S. Cl.
CPC .............. *H04L 45/02* (2013.01); *H04L 45/16* (2013.01); *H04L 45/48* (2013.01); *H04L 69/16* (2013.01)

(58) Field of Classification Search
CPC ......... H04L 67/10; H04L 41/50; H04L 67/02; H04L 67/42; H04L 67/22; H04L 67/306; H04L 67/30; H04L 47/14; H04L 51/046; H04L 63/0853; H04L 63/20; H04L 41/0893; H04L 41/0896; H04L 41/5029;
(Continued)

(56) References Cited

U.S. PATENT DOCUMENTS

2004/0199627 A1 10/2004 Frietsch
2005/0243722 A1* 11/2005 Liu .................... H04L 47/10
370/235

(Continued)

OTHER PUBLICATIONS

International Search Report and Written Opinion from the International Searching Authority, dated Oct. 25, 2021, 12 pages, for corresponding International Patent Application No. PCT/US2021/041614.

*Primary Examiner* — Djenane M Bayard
(74) *Attorney, Agent, or Firm* — Polsinelli PC

(57) ABSTRACT

Techniques for internet last-mile outage detection are disclosed herein. The techniques include methods for monitoring, by a network appliance associated with a network, a plurality of network nodes, detecting, by the network appliance, that a network node of the plurality of network nodes in a last mile of the network has disconnected from the network, overlaying, by the network appliance, the network node over a network model for at least a portion of the network including the network node to generate a model overlay, and determining, by the network appliance, a last mile outage source associated with a disconnection of the network node by identifying a lowest common ancestor node of the network node from the model overlay. Systems and computer-readable media are also provided.

18 Claims, 9 Drawing Sheets

(51) Int. Cl.
*H04L 45/16* (2022.01)
*H04L 45/48* (2022.01)

(58) Field of Classification Search
CPC ..... H04L 47/20; H04L 51/18; H04L 63/1425; H04L 67/16; H04L 67/20; H04L 67/34; H04L 12/1485; H04L 12/1492; H04L 12/1496; H04L 41/5006; H04L 41/5022; H04L 41/5054; H04L 47/2425; H04L 47/2475; H04L 47/803; H04L 47/805; H04L 47/822; H04L 47/824; H04L 51/04; H04L 51/063; H04L 51/10; H04L 51/20; H04L 63/0272; H04L 63/068; H04L 63/0861; H04L 63/102; H04L 63/107; H04L 63/1416; H04L 63/1466; H04L 67/18; H04L 67/303; H04L 12/14; H04L 12/1403; H04L 12/1482; H04L 2463/082; H04L 2463/144; H04L 29/06; H04L 29/08; H04L 29/08927; H04L 29/08936; H04L 41/20; H04L 41/5019; H04L 41/5041; H04L 43/045; H04L 43/062; H04L 43/08; H04L 43/0876; H04L 43/0888; H04L 43/106

See application file for complete search history.

(56) References Cited

U.S. PATENT DOCUMENTS

| | | | |
|---|---|---|---|
| 2006/0218301 A1* | 9/2006 | O'Toole | H04L 12/185 709/244 |
| 2009/0216880 A1 | 8/2009 | Lepeska | |
| 2010/0071061 A1* | 3/2010 | Crovella | H04L 43/16 726/23 |
| 2010/0157788 A1 | 6/2010 | Ellis et al. | |
| 2013/0286859 A1 | 10/2013 | Wei | |
| 2013/0311108 A1* | 11/2013 | Stetter | A61B 5/0205 702/22 |
| 2014/0029446 A1 | 1/2014 | Loher | |
| 2016/0254983 A1 | 9/2016 | Zhao et al. | |
| 2016/0352633 A1 | 12/2016 | Kapadia et al. | |
| 2020/0252317 A1* | 8/2020 | Westlin | H04L 43/10 |

\* cited by examiner

INTERNET LAST-MILE OUTAGE DETECTION USING IP-ROUTE CLUSTERING

CROSS-REFERENCE TO RELATED APPLICATIONS

This application claims priority to U.S. Provisional Patent Application No. 63/061,445, filed on Aug. 5, 2020, the content of which is incorporated herein by reference in its entirety.

TECHNICAL FIELD

The present technology pertains to detecting last-mile outages using IP-route clustering.

BACKGROUND

Most organizations require reliable Internet access. When an outage occurs, it can be time consuming to track down the cause of the issue. This is especially true when infrastructure causing the outage is outside of the control of the organization experiencing the problem. Large Internet outages at the scale of a city or an entire Internet service provider (ISP) may be detected. However, these large-scale outages are rare. Much more common are outages that impact a neighborhood or particular Internet route. These smaller-scale outages are difficult to detect.

BRIEF DESCRIPTION OF THE DRAWINGS

In order to describe the manner in which the various advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
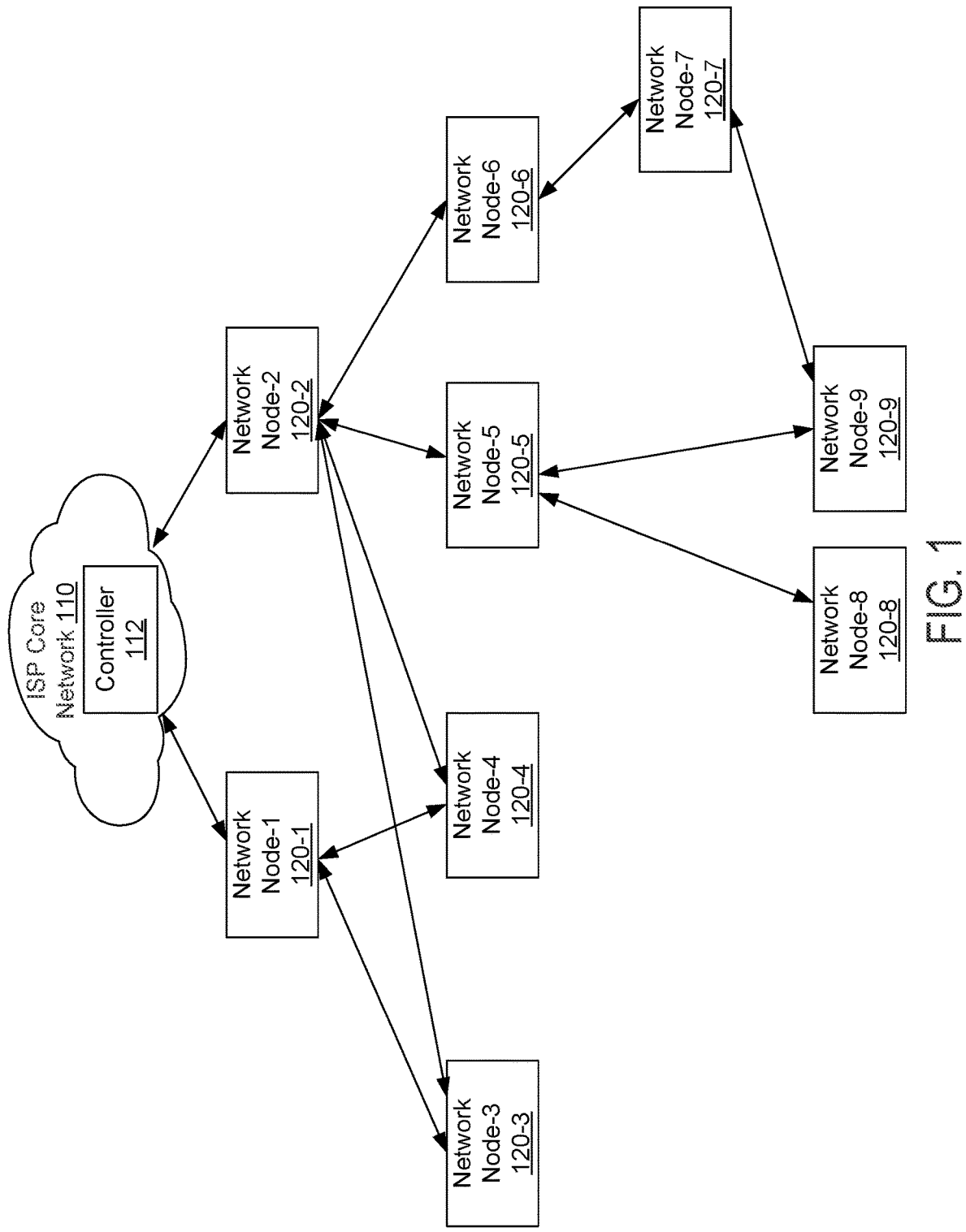
FIG. 1 illustrates an example network environment in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for outage detection in networking environments.

According to at least one example, a computer-implemented method for generating a network model is provided. The method can include sending, by a first network node, a network data packet to a second network node, the network data packet including a route associating the first network node as a source node and the second network node as a destination node, updating, by a third network node, the route when the network data packet traverses through the third network node, receiving, by the second network node, the network data packet, sending, by the second network node, the network data packet to a network appliance, and generating, by the network appliance, a network model based on the route of the network data packet.

According to at least one other example, a computer-implemented method for detecting Internet outages is also provided. The method can include monitoring, by a network appliance of a network, a plurality of network nodes in real-time, detecting, by the network appliance, at least one network node of the plurality of network nodes has disconnected from the network, overlaying, by the network appliance, the at least one network node over a network model, and determining, by the network appliance, an outage source for the at least one network node by identifying a lowest common ancestor node of the at least one network node.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

Description

Most organizations require reliable Internet access. As discussed above, smaller-scale outages are more common and more difficult to detect compared to large-scale outages, such as city-wide or entire Internet service provider (ISP) outages. For example, outages that impact a neighborhood or a particular Internet route may include a particular device being misconfigured, a network closet losing power, or some other local issue. These occur with more frequency and existing systems are not equipped to detect these types of outages. Furthermore, existing systems are likely inadequate to identify these issues in an IPv6 world because an IPv6 environment includes far more available IP addresses, many of which may not be utilized. In other words, active probing of an IPv6 environment will not work because IP addresses are less densely utilized compared to IPv4 environments. Thus, sending packets to each IP address and waiting for a response would be incredibly compute intensive and inefficient. Furthermore, ISPs frequently reassign IP addresses, which causes further inefficiencies.

Accordingly, the disclosed technology provides systems, methods, and computer-readable media for detecting smaller-scale outages that will work for both IPv4 and IPv6 environments. Additionally, the disclosed technology is useful for identifying outages in the last mile of telecommunications networks. The last mile is the final leg of the telecommunications network that delivers telecommunication services (e.g., Internet) to end-users (e.g., customers). For example, an outage that impacts a neighborhood or particular Internet route may occur because a particular device is misconfigured, a network closet loses power, or some other local issue. These outages can be classified as last mile outages and be difficult for existing technologies to detect. The disclosed technology can detect and character outages for last mile outages in an adaptive manner.

Figure 2:
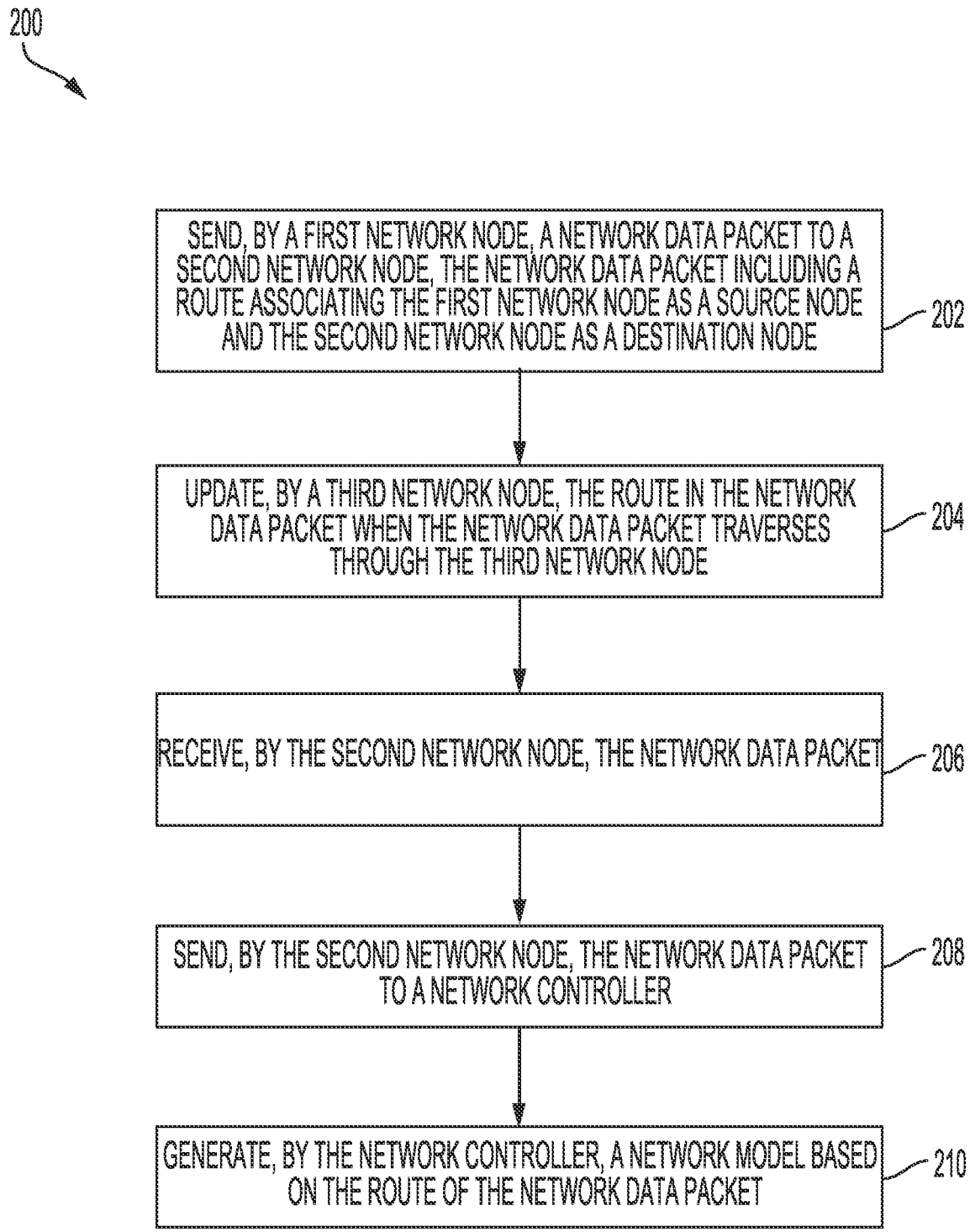
FIG. 2 illustrates an example method for generating a network mode in accordance with some examples.
Figure 3:
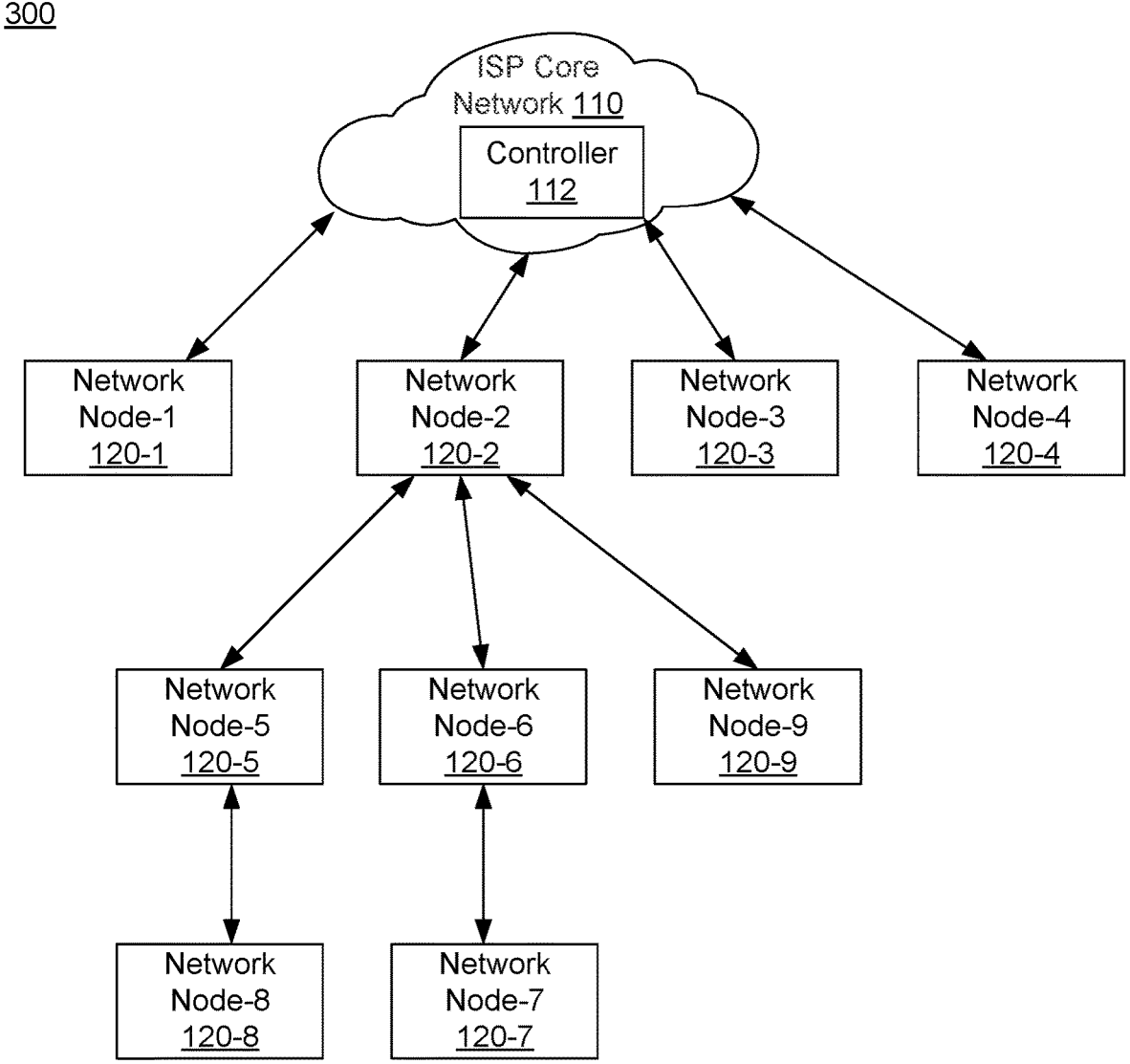
FIG. 3 illustrates an example tree data structure in accordance with some examples.
Figure 4:
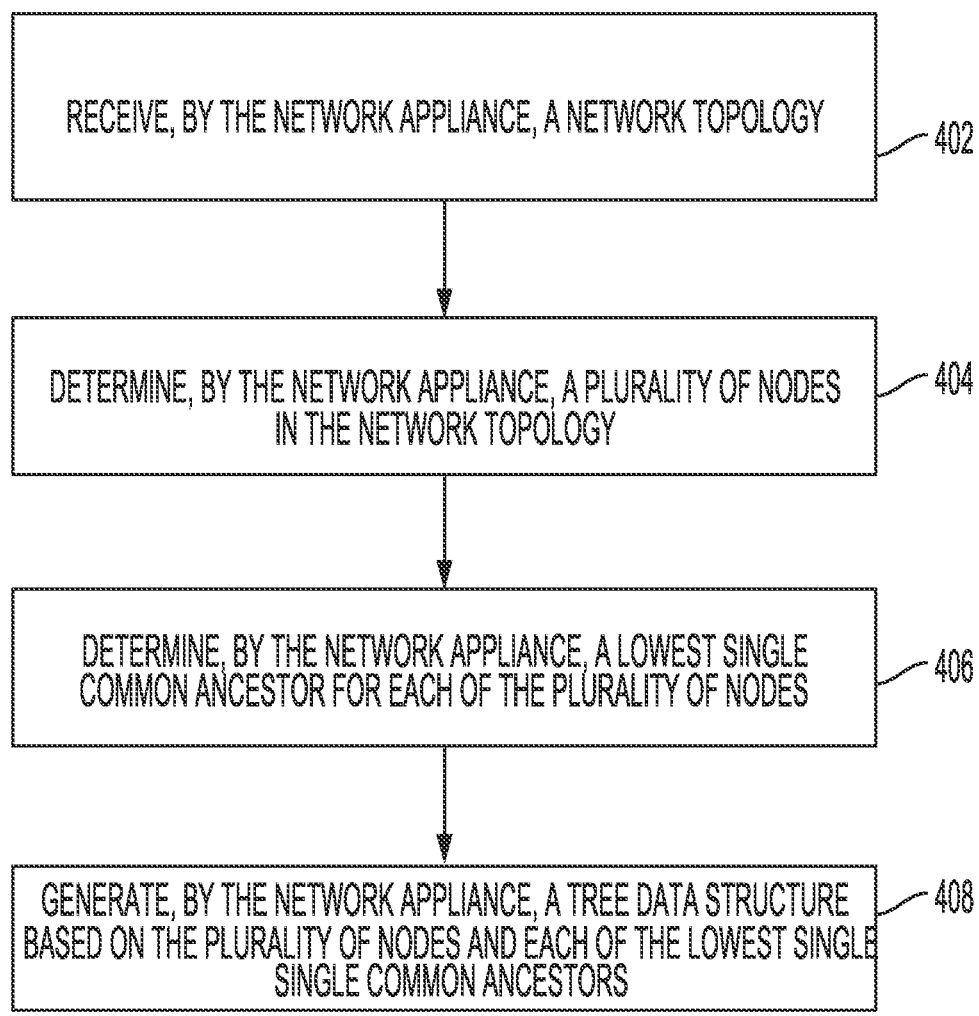
FIG. 4 illustrates an example method for generating an example tree data structure in accordance with some examples.

The present technology will be described in the subsequent disclosure as follows. The discussion begins with a description of example ISP networks having various network nodes (e.g. routers, switches, client endpoints), as illustrated in FIG. 1. A description of example methods for determining network structure is provided, as illustrated in FIG. 2. A description of example methods for detecting and identifying smaller-scale outages (e.g. last-mile outages) is provided, as illustrated in FIG. 3-4. The discussion concludes with a description of an example network device, as illustrated in FIG. 5, and an example computing device architecture including example hardware components suitable providing outage detection in networking environments, as illustrated in FIG. 6. The disclosure now turns to FIG. 1.

FIG. 1 illustrates an example network environment 100 having an Internet service provider (ISP) core network 110. ISP core network 110 communicates with various network nodes 120-1-120-9 (collectively 120). Communication between ISP core network 110 and across network nodes 120 can utilize a Border Gateway Protocol (BGP), including both exterior BGP (EBGP) and interior BGP (IBGP), or an interior gateway protocol (IGP). Furthermore, network nodes 120 can communicate amongst other network nodes by utilizing tunneling technologies.

ISP core network 110 can provide Internet access to one or more network nodes 120 by sending, receiving, maintaining, and monitoring data packets to and from network nodes 120. In some implementations, ISP core network 110 has a network appliance 112 configured to manage data packets within network environment 100. Furthermore, network appliance 112 can analyze data packets to create a network model and determine when network node 120 disconnects from network environment 100. For example, network appliance 112 can receive network data packets that include routes between network nodes. Network appliance 112 can then generate a network model based on connected nodes (e.g. routes between network nodes).

It is further contemplated that network appliance 112 need not be a part of ISP core network 110. For example, a third party application or service can similarly send, receive, maintain, and monitor data packets to and from network nodes 120. Additionally, a third party application or service can utilize the network data packets to generate the network model.

Network nodes 120 can connect to ISP core network 110. Network nodes 120 can be any type of network node including, but not limited to a router, an access point, a server, a hub, an antenna, a network interface card (NIC), a module, a cable, a firewall, a repeater, a sensor, a client end point, private networks, etc. Furthermore, network nodes 120 are configured to send and receive data packets to allow connected users to access the Internet. Additionally, network nodes 120 are configured to utilize wired protocols, wireless protocols, or any other protocols including, but not limited to TCP/IP, OSI (Open Systems Interconnection) protocols (e.g. L1-L7 protocols), routing protocols (e.g. RIP, IGP, BGP, STP, ARP, OSPF, EIGRP, NAT), or any other protocols (e.g. HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc.). It is also understood that network nodes 120 can receive and utilize one or more policies, configurations, services, settings, and/or capabilities (e.g. security policies, subnetting and routing schemes, forwarding schemes, NAT settings, VPN settings, IP mappings, port number, security information, network administration services, backup services, disaster recovery services, bandwidth or performance services, intrusion detection services, network monitoring services, content filtering services, application control, WAN optimization, firewall services, gateway service, storage services, protocol configuration services, wireless deployment services, etc.).

Moreover, network nodes 120 are configured to send, receive, and/or update or modify network data packets. Network data packets can be associated with a route between a first network node and a second network node. Furthermore, the network data packet can associate the first network node as a source node and the second network node as a destination node, such that the first network node can send the network data packet to the second network node through network environment 100. In some cases, the network data packet may traverse through a third network node to ultimately arrive at the second network node. In these cases, the third network node can be configured to update and/or modify the route of the network data packet to associate the third network node as a traversal node. Thus, when the second network node receives the network data packet, the network data packet identifies the source node of the network data packet and any traversal nodes in the route to the destination node. Additionally, network data packets can include IP addresses of any and/or all network nodes 120 that have interacted with the network data packets (e.g. sending node, receiving node, intermediate nodes). In some implementations, network nodes 120 can implement a traceroute function, multiple traceroute functions, multitraceroute functions (e.g. Dublin Traceroute), etc.

Traceroute functions, as used herein, can include computer network diagnostics commands to generate and display possible routes and measure delays of packets across an Internet Protocol (IP) network. Furthermore, the history of the route can be recorded as round-trip times of the packets received from each network node 120 in the route.

Network appliance 112 can utilize the information gathered by the traceroute functions (e.g., the network data packets) to generate a network topology. In some embodiments, the network appliance may convert the one or more routes identified through tracerouting into a graph (e.g., a directed acyclical graph) of connections between network nodes 120 in the plurality of network nodes 120. The graph can then be transformed and/or used to generate a network model (e.g., a tree data structure) based on nodes in the graph.

Furthermore, the network topology generated by network appliance 112 can identify communications between specific network nodes 120 and ISP core network 110. More specifically, network appliance can identify that communications from ISP core network 110 to, towards, and/or through a specific network node 120 is a downstream communication, while communications from a network node 120 to or towards core network 110 is an upstream communication. It is to be understood, however, that a communication need not traverse through ISP core network 110. For example, a communication from network node 120-8 to network node 120-5 would be an upstream communication, while a communication from network node 120-5 to network node 120-8 would be a downstream communication.

FIG. 2 illustrates an example method 200 for generating a network model. The method 200 shown in FIG. 2 is provided by way of example, as there are a variety of ways to carry out the method. Additionally, while the example method is illustrated with a particular order of steps, those of ordinary skill in the art will appreciate that FIG. 2 and the modules shown therein can be executed in any order and can include fewer or more modules than illustrated. Further, each module shown in FIG. 2 represents one or more steps, processes, methods, or routines in the method.

At block 202, the method 200 can send, for example by a first network node, a network data packet to a second network node. The network data packet can include a route associating the first network node as a source node and the second network node as a destination node.

At block 204, the method 200 can update, by a third network node, the route in the network data packet when the network data packet traverses through the third network node.

At block 206, the method 200 receives, by the second network node, the network data packet with the updated route indicating that the network data packet has traversed through the third network node.

At block 208, the method 200 sends, by the second network node, the network data packet to a network appliance with the updated route.

At block 210, the method 200 generates, by the network appliance, a network model based on the route of the network data packet. In some cases, multiple network data packets may have been sent and received by various other nodes. In these cases, the network appliance can generate and/or update the network model. As discussed above, it is further contemplated that the network appliance can be an appliance outside of the ISP. In other words, a network appliance outside of the ISP can also generate the network model based on the route of the network data packet.

Furthermore, in some cases, multiple routes are available between network nodes. Thus, in these cases, the network model can include multiple routes between these network nodes. For example, a Dublin Traceroute function can identify a superset of possible paths between network nodes. Thus, the network appliance can use the multiple routes between network nodes to generate the network model having multiple routes between network nodes. Accordingly, the network model reflects a current state of infrastructure and topology of a given network environment and can be used to efficiently answer common ancestor (e.g. connected network nodes closer to ISP core network 110) related queries. One of ordinary skill in the art will also understand that new network nodes can be added to the network model when added to the network environment.

FIG. 3 illustrates an example tree data structure 300 generated and/or transformed from a network environment (e.g., network environment 100). More specifically, network appliance 112 can generate and/or transform a tree data structure 300 from network environment 100. A tree data structure is an undirected graph in which any two nodes are connected by exactly one path. As shown, tree data structure 300 contains network nodes 120 from network environment 100 in a different structure. To generate tree data structure 300, network appliance 112 can apply an algorithm (e.g., method 400 below) to compute tree data structure 300. Tree data structure 300 provides a structure that accurately reflects a state of network environment 100, while also providing a data structure that is efficient in answering common ancestor related queries. More specifically, tree data structure 300 identifies (fuzzy) common ancestors for each network node 120. The tree data structure 300 can then be used as a network model for answering common ancestor related queries (e.g., for identifying a single point of failure for an outage of one or more network nodes 120).

FIG. 4 illustrates an example method 400 for generating, converting, or transforming network topology to a tree data structure (e.g., tree data structure 300). The method 400 shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated. Further, each module shown in FIG. 4 represents one or more steps, processes, methods, or routines in the method.

At block 402, a network controller receives a network topology (e.g., data packets reflecting network environment 100 and/or a directed acyclical graph of network environment 100).

At block 404, the network appliance can determine a plurality of nodes (e.g., network nodes 120) in the network topology.

At block 406, the network appliance can determine a lowest single common ancestor for each of the plurality of nodes. The lowest single common ancestor can be a first ancestor node upstream of a particular node of the plurality of nodes in the network model (e.g., tree data structure 300).

At block 408, the network appliance can generate a tree data structure based on the plurality of nodes and each of the lowest single common ancestors. The tree can be configured to have redundant paths (e.g., multiple paths or routes between nodes) in a graph removed and a node can be directly connected to the lowest single common ancestor. For example, in FIG. 1, network node 120-4 has multiple routes from ISP core network 110. Thus, network node 120-4 is shown in FIG. 3 to have a single common ancestor at ISP core network 110. As another example, in FIG. 1, network node 120-8 only has one route through network node 120-5. Thus, network node 120-8 is shown to have a single common ancestor at network node 120-5 in FIG. 3.

Figure 5A:
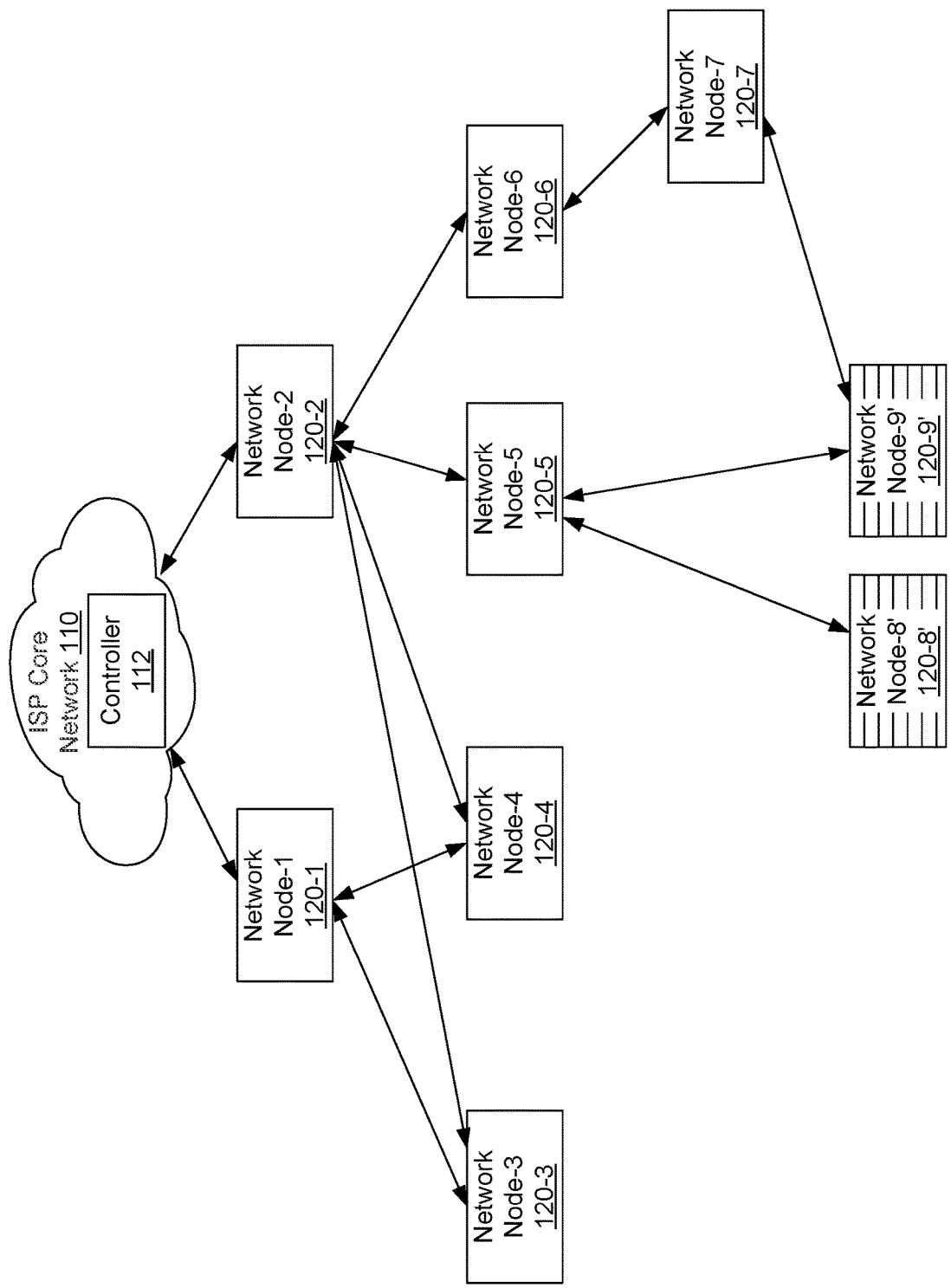
FIG. 5A illustrates an example network environment with an outage in accordance with some examples.
Figure 5B:
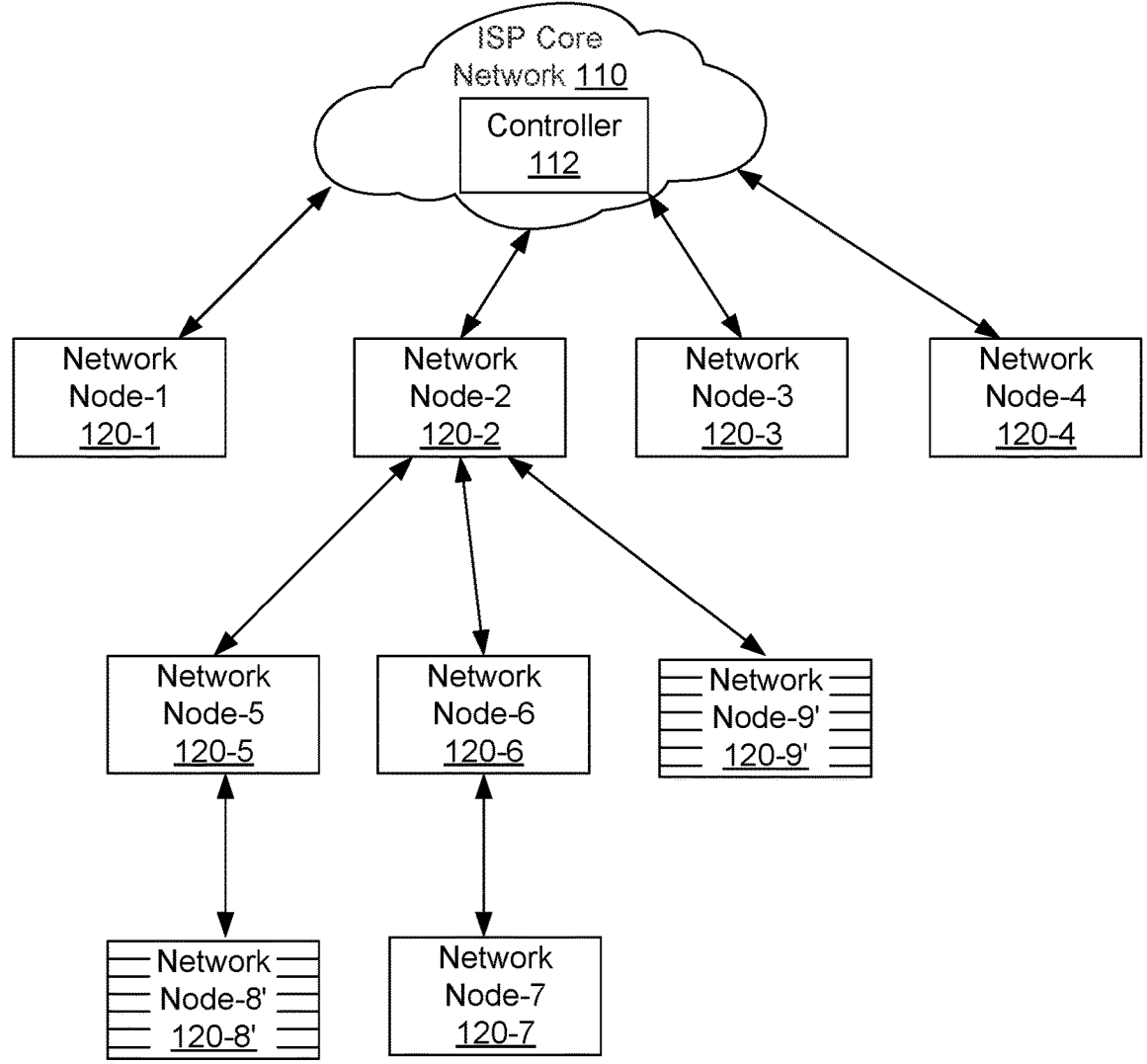
FIG. 5B illustrates an example tree data structure with an outage in accordance with some examples.
Figure 6:
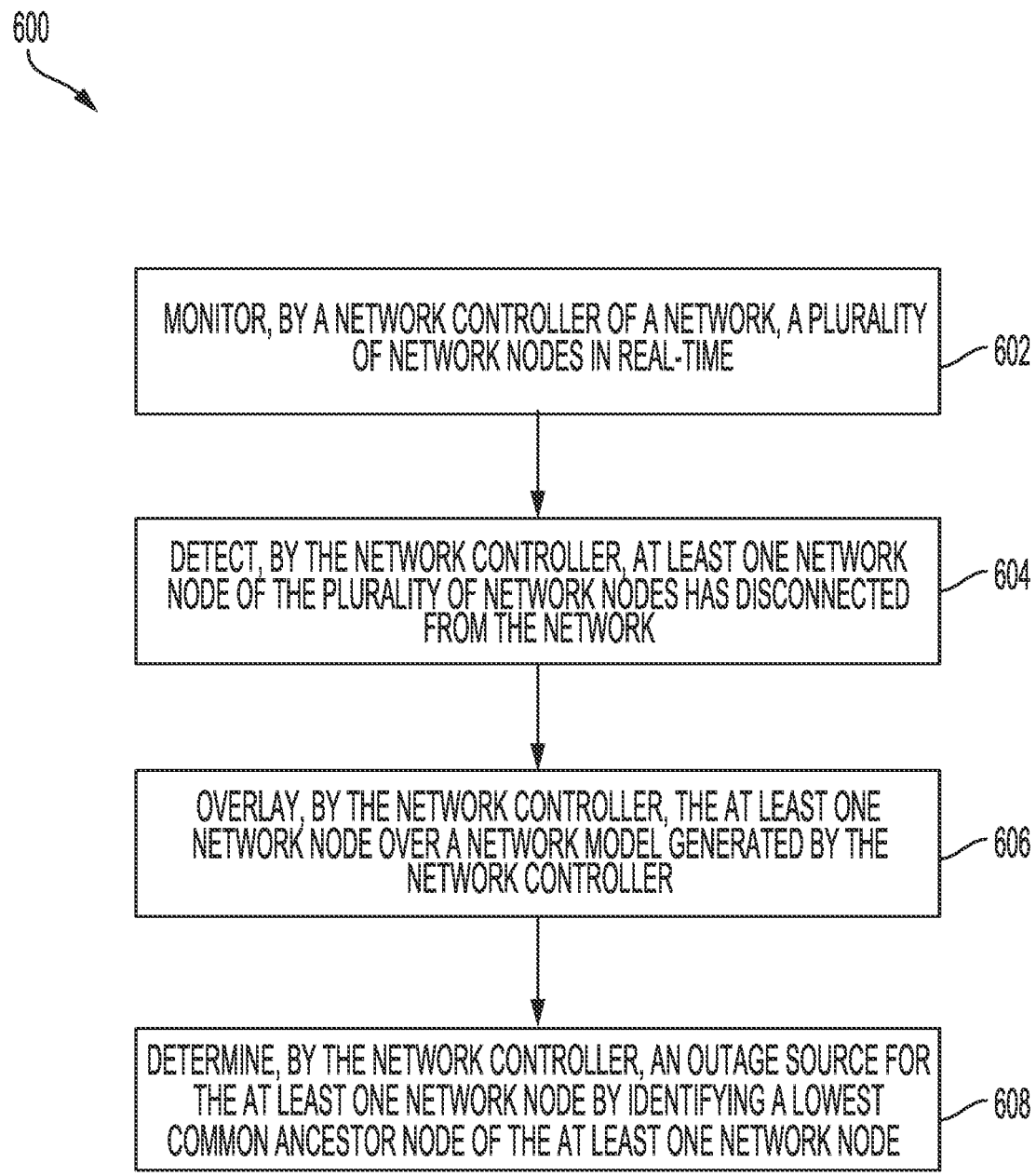
FIG. 6 illustrates an example method for detecting outages in a network environment in accordance with some examples.

FIGS. 5A and 5B illustrates an example network environments 500a, 500b having an ISP core network 110 and network nodes 120-1-120-7 (collectively network nodes 120). Network environments 500a, 500b are reflective of the same network environment (collectively network environment 500). More specifically, FIG. 5A illustrates network environment 500a in an acyclical graph format, while FIG. 5B illustrates network environment 500b in a tree data structure format. As discussed above, the tree data structure of environment 500*b* provides lowest single common ancestor nodes for each network node 120. Additionally, network environment 500 has detected that some network nodes are now disconnected network nodes 120-8-120-9 (collectively disconnected network nodes 120').

As discussed above, ISP core network 110 can include a network appliance 112. Network appliance 112 can be configured to detect when a network node 120 has become a disconnected network node 120'. For example, network nodes 120 can be configured to periodically send data packets to indicate that network nodes 120 are still connected to ISP core network 110 and network appliance 112 can be configured to receive and monitor the data packets. Thus, when network appliance 112 does not receive a data packet from disconnected network nodes 120', network appliance 112 can determine that disconnected network nodes 120' are disconnected from ISP core network 110.

Additionally, network appliance 112 can be configured to identify a source of failure causing network nodes 120 to become disconnected network nodes 120'. More specifically, based on the network model generated by network appliance 112, network appliance 112 can identify common links and alternative routes between network nodes 120 generally. Thus, by searching for common network nodes for disconnected network nodes 120', network appliance 112 can identify the source of failure. For example, in FIG. 5A network nodes 120-8', 120-9' have network node 120-5 as a common connected network node 120. However, if network node 120-5 was the source of failure, disconnected network node 120-9' would not be disconnected due to possible routing across network nodes 120-6, 120-7. Thus, network node 120-2 is likely to be the source of failure. In other words, the result of analysis by network appliance 112 is a node in the network model highlighting a potential single point of failure and delimiting an area currently experiencing an outage. With this approach, network appliance 112 can pick up and characterize failures (e.g. outages) at not only a smaller scale, but also in an adaptive manner. Accordingly, network appliance 112 can detect, identify, and present outages from a hyper local outage (e.g. an outage of a customer's router) to large, wide-scale ISP outages (e.g. an outage affecting an entire city) and middle scale outages in between (e.g. a power outage in a district or neighborhood).

This can be further streamlined by utilizing the tree data structure of FIG. 5B. Continuing the example above, network nodes 120-8', 120-9' are not shown to have network node 120-5 as a common connected network node 120. Instead, the tree data structure identifies network node 120-2 as the lowest common ancestor. Thus, by pre-computing the tree data structure and utilizing the tree data structure for queries, common ancestor related queries can be answered with increased efficiency.

FIG. 6 illustrates an example method 600 for identifying a source of failure in a network environment (e.g. a last-mile outage). The method 600 shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated. Further, each module shown in FIG. 6 represents one or more steps, processes, methods, or routines in the method.

At block 602, the method 600 can monitor, by a network appliance of a network, a plurality of network nodes in real-time. The network nodes can be monitored through an applicable technique for detecting outages at a node-level, e.g. in real-time. For example, the network appliance can be configured to receive data packets from the plurality of network nodes in scheduled intervals. As discussed above, the network appliance can be separate from the ISP. In other words, the network appliance can be an application, service, and/or device that can perform the same.

At block 604, the method 600 can detect, by the network appliance, at least one network node of the plurality of network nodes has disconnected from the network. In monitoring network nodes and detecting disconnection of network nodes, an IP address of a node that is a subject of an outage can be identified. For example, the network appliance can detect that a network node has disconnected from the network when the network appliance fails to receive a data packet from the network node at a predetermined time or within a set amount of time.

In monitoring network nodes and identifying disconnected nodes, streams of device disconnections, e.g. resulting from the aggregation of M-tunnel status, can be monitored. Further, an applicable outage detection scheme can be applied to identify potential internet outages. An applied outage detection scheme can be defined by an outage model, which can be based on a burst model, e.g. a Kleinberg burst model, or a binomial mode, e.g. based on elementary binomial testing. Further, a set of potentially disrupted IP addresses can be identified as an outage occurs.

At block 606, the method 600 can overlay, by the network appliance, the at least one network node over a network model generated by the network appliance. For example, the network model may be the network model generated by the network appliance at block 210 in FIG. 2. A model overlay is then generated from the at least one network node overlaid onto the network model. The model overlay can identify and/or show the disconnected node (e.g., the at least one network node) in the scheme of the network model. For example, FIGS. 5A and 5B show the model overlay overlaid on the network model to identify and demonstrate the at least one network node that has disconnected (e.g., network nodes 120-8' and 120-9').

At block 608, the method 600 can determine, by the network appliance, an outage source for the at least one network node by identifying a lowest common ancestor node of the at least one network node. More specifically, the lowest common ancestor node can be a closest upstream node to the network node in the network that provides a single point of failure for either or both upstream communication from the network node and downstream communication to the network node. In situations where two or more network nodes experience an outage, the lowest common ancestor node of the two or more network nodes can be a closest shared upstream node to the network node in the network that provides a single point of failure for either or both upstream communications from the two or more network nodes and downstream communication to the two or more network nodes.

Figure 7:
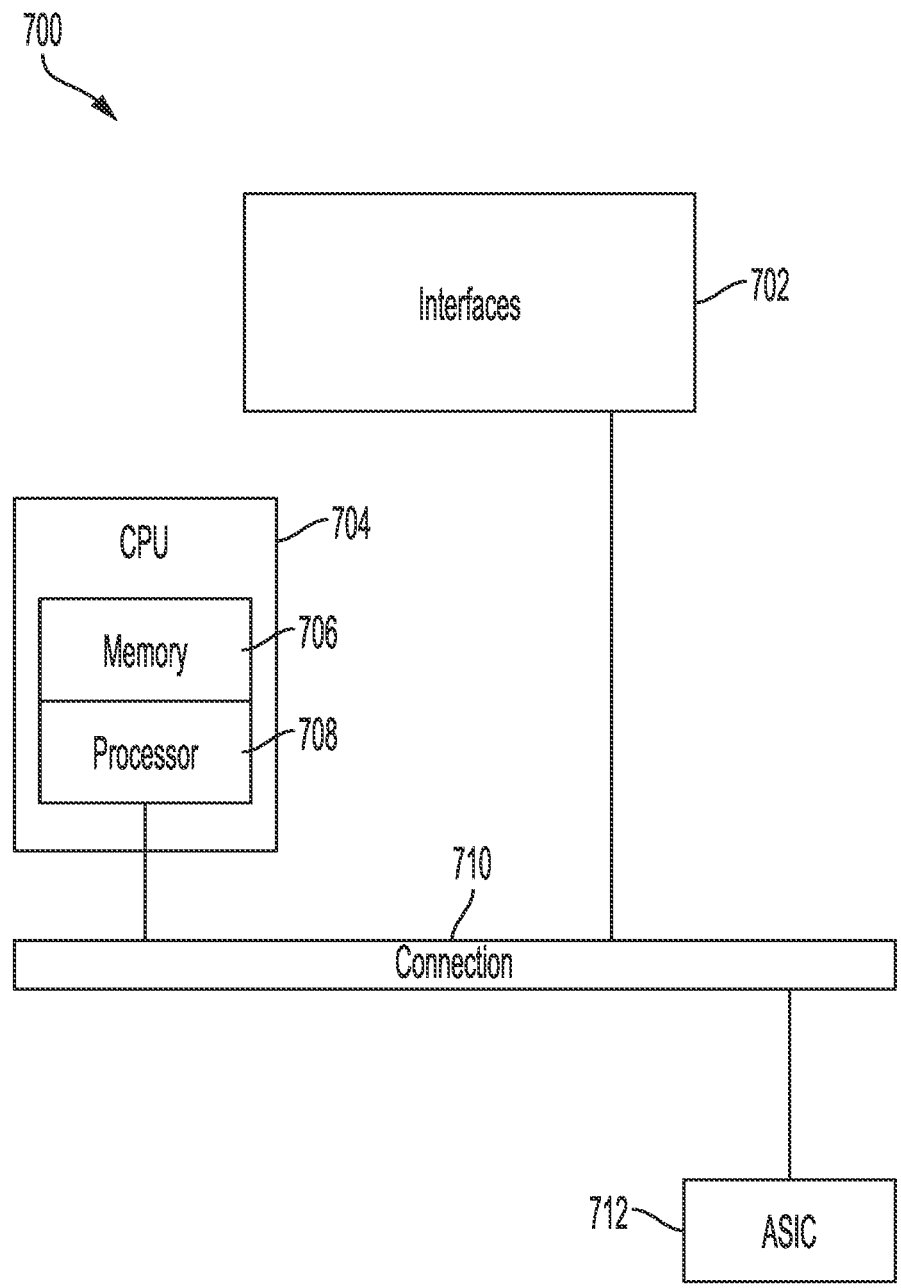
FIG. 7 illustrates an example network device in accordance with some examples.
Figure 8:
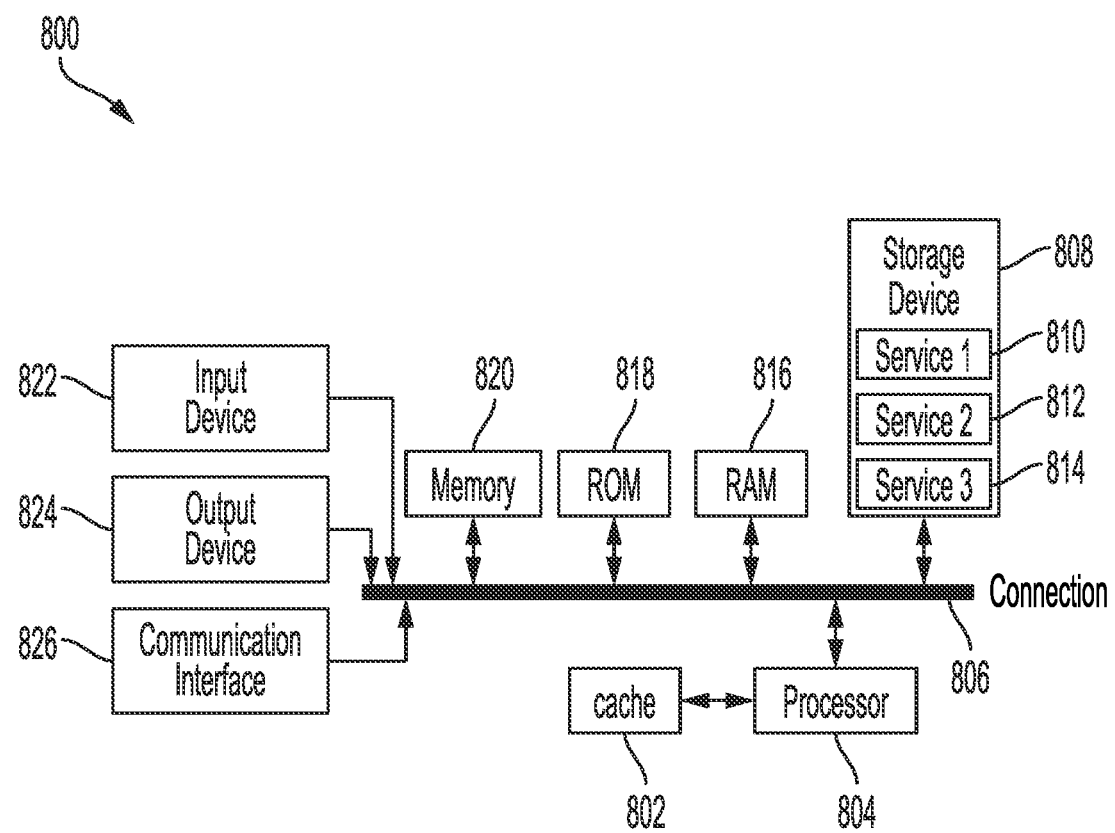
FIG. 8 illustrates an example computing device in accordance with some examples.

The disclosure now turns to FIGS. 7 and 8, which illustrate example network devices and computing devices, such as switches, routers, nodes, servers, client devices, orchestrators, and so forth.

FIG. 7 illustrates an example network device 700 (e.g. network nodes 120) suitable for performing switching, routing, load balancing, and other networking operations. Network device 700 includes a central processing unit (CPU) 704, interfaces 702, and a bus 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. CPU 704 may include one or more processors 708, such as a processor from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/7G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the bus 710, to exchange data and signals and coordinate various types of operations by the network device 700, such as routing, switching, and/or data storage operations, for example.

FIG. 8 illustrates an example computing system architecture of a system 800 (e.g. network appliance 112) which can be used to process FaaS operations and requests, deploying execution environments, loading code associated with FaaS functions, and perform any other computing operations described herein. In this example, the components of the system 800 are in electrical communication with each other using a connection 806, such as a bus. The system 800 includes a processing unit (CPU or processor) 804 and a connection 806 that couples various system components including a memory 820, such as read only memory (ROM) 818 and random access memory (RAM) 816, to the processor 804.

The system 800 can include a cache of high-speed memory connected directly with, in close proximity to, or integrated as part of the processor 804. The system 800 can copy data from the memory 820 and/or the storage device 808 to cache 802 for quick access by the processor 804. In this way, the cache can provide a performance boost that avoids processor 804 delays while waiting for data. These and other modules can control or be configured to control the processor 804 to perform various actions. Other memory 820 may be available for use as well. The memory 820 can include multiple different types of memory with different performance characteristics. The processor 804 can include any general purpose processor and a hardware or software service, such as service 1 810, service 2 812, and service 3 814 stored in storage device 808, configured to control the processor 804 as well as a special-purpose processor where software instructions are incorporated into the actual processor design. The processor 804 may be a completely self-contained computing system, containing multiple cores or processors, a bus, memory controller, cache, etc. A multi-core processor may be symmetric or asymmetric.

To enable user interaction with the computing system 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the computing system 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 816, read only memory (ROM) 818, and hybrids thereof.

The storage device 808 can include services 810, 812, 814 for controlling the processor 804. Other hardware or software modules are contemplated. The storage device 808 can be connected to the connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

What is claimed is:

1. A computer-implemented method comprising:
   monitoring, by a network appliance associated with a network, a plurality of network nodes;
   detecting, by the network appliance, that a network node of the plurality of network nodes in a last mile of the network has disconnected from the network;
   identifying lowest common ancestor nodes for each of the plurality of network nodes that are closest upstream nodes to the plurality of network nodes in the network that provide a single point of either or both upstream communication from each of the plurality of network nodes and downstream communication to each of the plurality of network nodes;
   generating a network model that directly connects each of the plurality of network nodes to a corresponding lowest common ancestor node for each of the plurality of network nodes;
   overlaying, by the network appliance, the network node over the network model to generate a model overlay that is indicative of a lowest common ancestor node for the network node; and
   determining, by the network appliance, a last mile outage source associated with a disconnection of the network node based on the lowest common ancestor node of the network node identified from the model overlay.

2. The computer-implemented method of claim 1, wherein the network is formed, at least in part through an Internet Service Provider (ISP) network, and the network appliance is separate from the ISP network.

3. The computer-implemented method of claim 1, further comprising:
   receiving, by the network appliance, one or more data packets traversing at least a portion of the plurality of network nodes as part of tracerouting; and
   generating the network model based on one or more routes of the one or more data packets identified through the tracerouting and received at the network appliance.

4. The computer-implemented method of claim 3, wherein the tracerouting is performed as part of multiple tracerouting that includes identifying a plurality of routes that the one or more data packets traverse.

5. The computer-implemented method of claim 3, further comprising:
   converting the one or more routes identified through the tracerouting into a directed acyclic graph of connections between nodes in the at least a portion of the plurality of nodes; and
   transforming the acyclic graph into a tree to form the model.

6. The computer-implemented method of claim 5, wherein the lowest common ancestor node to the network node is a first ancestor node to the network node in the tree.

7. The computer-implemented method of claim 1, further comprising:
   detecting that the network node has disconnected from the network in response to failing to receive, by the network appliance, a packet from the network node at a predetermined time.

8. The computer-implemented method of claim 1, wherein the network model is generated based on IPv6 addresses associated with nodes in the at least a portion of the network.

9. The computer-implemented method of claim 1, wherein the network model is generated based on IPv4 addresses associated with nodes in the at least a portion of the network.

10. A system comprising:
one or more processors; and
one or more memories storing computer-readable instructions, which when executed by the one or more processors, cause the one or more processors to:
monitor, by a network appliance associated with a network, a plurality of network nodes;
detect, by the network appliance, that a network node of the plurality of network nodes in a last mile of the network has disconnected from the network;
identify lowest common ancestor nodes for each of the plurality of network nodes that are closest upstream nodes to the plurality of network nodes in the network that provide a single point of either or both upstream communication from each of the plurality of network nodes and downstream communication to each of the plurality of network nodes;
generate a network model that directly connects each of the plurality of network nodes to a corresponding lowest common ancestor node for each of the plurality of network nodes;
overlay, by the network appliance, the network node over the network model to generate a model overlay that is indicative of a lowest common ancestor node for the network node; and
determine, by the network appliance, a last mile outage source associated with a disconnection of the network node based on the lowest common ancestor node of the network node identified from the model overlay.

11. The system of claim 10, wherein the network is formed, at least in part through an Internet Service Provider (ISP) network, and the network appliance is separate from the ISP network.

12. The system of claim 10, wherein the instructions further cause the one or more processors to:
receive, by the network appliance, one or more data packets traversing at least a portion of the plurality of network nodes as part of tracerouting; and
generate the network model based on one or more routes of the one or more data packets identified through the tracerouting and received at the network appliance.

13. The system of claim 12, wherein the tracerouting is performed as part of multiple tracerouting that includes identifying a plurality of routes that the one or more data packets traverse.

14. The system of claim 12, wherein the instructions further cause the one or more processors to:
convert the one or more routes identified through the tracerouting into a directed acyclic graph of connections between nodes in the at least a portion of the plurality of nodes; and
transform the acyclic graph into a tree to form the model.

15. The system of claim 14, wherein the lowest common ancestor node to the network node is a first ancestor node to the network node in the tree.

16. The system of claim 10, wherein the instructions further cause the one or more processors to:
detect that the network node has disconnected from the network in response to failing to receive, by the network appliance, a packet from the network node at a predetermined time.

17. The system of claim 10, wherein the network model is generated based on IPv4 or IPv6 addresses associated with nodes in the at least a portion of the network.

18. A non-transitory computer-readable medium comprising instructions, which when executed by one or more processors, cause the one or more processors to:
monitor, by a network appliance associated with a network, a plurality of network nodes;
detect, by the network appliance, that a network node of the plurality of network nodes in a last mile of the network has disconnected from the network;
identify lowest common ancestor nodes for each of the plurality of network nodes that are closest upstream nodes to the plurality of network nodes in the network that provide a single point of either or both upstream communication from each of the plurality of network nodes and downstream communication to each of the plurality of network nodes;
generate a network model that directly connects each of the plurality of network nodes to a corresponding lowest common ancestor node for each of the plurality of network nodes;
overlay, by the network appliance, the network node over the network model to generate a model overlay that is indicative of a lowest common ancestor node; and
determine, by the network appliance, a last mile outage source associated with a disconnection of the network node based on the lowest common ancestor node of the network node identified from the model overlay.

* * * * *